US006831138B2

(12) United States Patent
Wang

(10) Patent No.: US 6,831,138 B2
(45) Date of Patent: Dec. 14, 2004

(54) POLYMER-CONTAINING ORGANO-METAL CATALYSTS

(75) Inventor: Yi-Feng Wang, Waterford, NY (US)

(73) Assignee: Cyclics Corporation, Schenectady, NY (US)

(*) Notice: Subject to any disclaimer, the term of this patent is extended or adjusted under 35 U.S.C. 154(b) by 0 days.

(21) Appl. No.: 10/040,530

(22) Filed: Jan. 7, 2002

(65) Prior Publication Data

US 2003/0162654 A1 Aug. 28, 2003

(51) Int. Cl.$^7$ .............................. C08F 2/00; C08G 85/00
(52) U.S. Cl. ..................... 526/62; 525/7.1; 502/159; 502/104; 502/107; 502/308; 502/310
(58) Field of Search ........................... 526/62; 525/7.1; 502/159, 104, 107, 308, 310

(56) References Cited

U.S. PATENT DOCUMENTS

| 2,628,171 A | 2/1953 | Green ................... 106/271 |
| 3,018,272 A | 1/1962 | Griffing et al. ............ 260/75 |
| 3,090,753 A | 5/1963 | Matuszak et al. ........ 252/42.7 |

(List continued on next page.)

FOREIGN PATENT DOCUMENTS

| CH | 654 304 A5 | 2/1986 |
|---|---|---|
| CN | 1120555 | 4/1996 |
| EP | 0000544 B1 | 8/1982 |
| EP | 0216496 A2 | 4/1987 |
| EP | 419254 A2 | 3/1991 |
| EP | 486832 A2 | 5/1992 |
| EP | 264835 B1 | 6/1992 |
| EP | 543492 A1 | 5/1993 |
| EP | 589640 A1 | 3/1994 |
| EP | 598604 A1 | 5/1994 |
| EP | 601753 A1 | 6/1994 |
| EP | 635512 A1 | 1/1995 |
| EP | 655476 A1 | 5/1995 |
| EP | 688778 A1 | 12/1995 |
| EP | 0714926 A2 | 6/1996 |
| EP | 699701 A3 | 9/1996 |
| EP | 0798336 A2 | 1/1997 |
| GB | 798412 | 8/1954 |
| GB | 957841 | 5/1964 |
| GB | 991020 | 5/1965 |
| GB | 1044205 | 9/1966 |
| GB | 1108921 | 4/1968 |
| GB | 1273225 | 5/1972 |
| GB | 1349324 | 4/1974 |
| GB | 2 123 405 A | 2/1984 |
| JP | 4621873 | 6/1971 |
| JP | 57-122078 A | 7/1982 |
| JP | 6275547 | 4/1987 |
| JP | 62141063 A | 6/1987 |
| JP | 63156824 A | 11/1988 |
| JP | 02298512 | 12/1990 |
| JP | 4253764 | 9/1992 |
| JP | 08-093594 | 4/1996 |
| JP | 09048876 | 2/1997 |
| JP | 09-238806 | 9/1997 |
| JP | 10-069915 | 3/1998 |
| JP | 10-194262 | 7/1998 |
| JP | 11-136942 | 5/1999 |
| JP | 2001031846 | 2/2001 |
| JP | 202293902 | 10/2002 |
| JP | 2002293902 | 10/2002 |
| JP | 2002293903 | 10/2002 |
| JP | 2002308969 | 10/2002 |
| JP | 2002317041 | 10/2002 |
| JP | 02320499 | 11/2002 |
| JP | 02322272 | 11/2002 |
| JP | 02338672 | 11/2002 |
| JP | 2003082081 | 3/2003 |
| SU | 1077893 | 3/1984 |
| SU | 1532560 A1 | 12/1989 |
| WO | 88/ 06605 | 9/1988 |
| WO | 91/09899 | 7/1991 |
| WO | 93/ 04106 | 3/1993 |
| WO | 95/00574 | 1/1995 |
| WO | 95/30702 | 11/1995 |
| WO | 96/22319 | 7/1996 |
| WO | 99/25485 | 5/1999 |
| WO | 00/27632 | 5/2000 |
| WO | 00/38897 | 7/2000 |
| WO | 01/53379 A1 | 7/2001 |
| WO | 01/56694 A1 | 8/2001 |
| WO | 02/18476 A2 | 3/2002 |
| WO | 02/22738 A2 | 3/2002 |
| WO | 02/098946 A1 | 12/2002 |
| WO | 03/031496 A1 | 4/2003 |

OTHER PUBLICATIONS

Chisholm et al. "Syntheses and structural characterization of 2,2'–methylene–bis(6–t–butyl–4–methyl–phenoxide) complexes of titanium, zirconium and tantalum," *Polyhedron*, vol. 16, No. 17, (1997) pp. 2941–2949.

Durfee et al. "Chemical and Electrochemical Reduction of Titanium (IV) Aryloxides," *Inorganic Chemistry*, 24 (1985) pp. 4569–4573.

Fantacci et al. "Density Functional Study of Tetraphenolate and Calix[4]arene Complexes of Early Transition Metals," *Inorganic Chemistry*, 40 (2001) pp. 1544–1549.

Hamb et al. "Synthesis of Cyclic Tris(Ethylene Terephthalate)," *Polymer Letters*, 5 (1967), pp. 1057–1058.

(List continued on next page.)

Primary Examiner—Mark L. Bell
Assistant Examiner—Jennine M. Brown
(74) Attorney, Agent, or Firm—Testa, Hurwitz & Thibeault, LLP

(57) ABSTRACT

The invention relates to polymer-containing catalysts (e.g., polymer-containing organo-metal catalysts) that may be useful in various applications (e.g., polymerization of macrocyclic oligoesters). Advantages of these catalysts include the improved ability to prepare, store, and handle the catalyst in open air; higher molar volume and molecular weight; and the ability to produce a blend of reactants and a catalyst (e.g., a macrocyclic oligoester and a polymerization catalyst) for subsequent one-step reaction (e.g., polymerization of macrocyclic oligoesters).

6 Claims, No Drawings

U.S. PATENT DOCUMENTS

| | | |
|---|---|---|
| 3,786,067 A | 1/1974 | Throckmorton et al. .... 260/327 |
| 3,979,354 A | 9/1976 | Dyckman et al. ....... 260/37 EP |
| 4,012,460 A | 3/1977 | Takahashi ............... 260/878 R |
| 4,075,319 A | 2/1978 | Dyckman et al. ............. 424/78 |
| 4,082,709 A | 4/1978 | Dyckman et al. ....... 260/22 CB |
| 4,232,087 A | 11/1980 | Trask .......................... 428/389 |
| 4,478,963 A | 10/1984 | McGarry .................... 523/205 |
| 4,535,102 A | 8/1985 | Kusumoto et al. .......... 523/116 |
| 4,568,703 A | 2/1986 | Ashida |
| 4,590,259 A | 5/1986 | Kosky et al. ............... 528/272 |
| 4,605,731 A | 8/1986 | Evans et al. ................ 528/371 |
| 4,616,077 A | 10/1986 | Silva .......................... 528/371 |
| 4,638,077 A | 1/1987 | Brunelle et al. ............. 558/281 |
| 4,644,053 A | 2/1987 | Brunelle et al. ............. 528/371 |
| 4,680,345 A | 7/1987 | Kobayashi et al. ......... 525/437 |
| 4,727,134 A | 2/1988 | Brunelle et al. ............. 528/371 |
| 4,740,583 A | 4/1988 | Brunelle et al. ............. 528/370 |
| 4,757,132 A | 7/1988 | Brunelle et al. ............. 528/357 |
| 4,785,060 A | 11/1988 | Nagler ....................... 525/444 |
| 4,803,288 A | 2/1989 | Kitamura et al. ........... 549/267 |
| 4,816,548 A | 3/1989 | Evans et al. ................ 528/370 |
| 4,824,595 A | 4/1989 | Richter et al. ......... 252/182.17 |
| 4,829,144 A | 5/1989 | Brunelle et al. ............. 528/176 |
| 4,831,001 A | 5/1989 | Evans et al. ................ 502/153 |
| 4,888,411 A | 12/1989 | Shannon et al. ............ 528/199 |
| 4,889,903 A | 12/1989 | Baghdachi ................... 528/17 |
| 4,900,706 A * | 2/1990 | Sasaki et al. ............... 502/116 |
| 4,904,810 A | 2/1990 | Brunelle et al. ............. 558/281 |
| 4,909,846 A | 3/1990 | Barfurth et al. .............. 106/22 |
| 4,980,453 A | 12/1990 | Brunelle et al. ............. 528/352 |
| 4,992,228 A | 2/1991 | Heck et al. ................. 264/135 |
| 4,999,420 A | 3/1991 | Leitz et al. ................. 528/371 |
| 5,006,637 A | 4/1991 | Guggenheim et al. ...... 528/355 |
| 5,023,346 A | 6/1991 | Schon et al. ................ 549/231 |
| 5,039,717 A | 8/1991 | Kawakami et al. ......... 523/100 |
| 5,039,783 A | 8/1991 | Brunelle et al. ............. 528/272 |
| 5,071,711 A | 12/1991 | Heck et al. ............... 428/542.8 |
| 5,095,088 A | 3/1992 | Wang ........................ 528/203 |
| 5,097,008 A | 3/1992 | Krabbenhoft et al. ....... 528/371 |
| 5,116,900 A | 5/1992 | Flautt et al. ................. 524/377 |
| 5,191,013 A | 3/1993 | Cook et al. ................. 524/601 |
| 5,191,038 A | 3/1993 | Krabbenhoft et al. ....... 525/462 |
| 5,202,386 A * | 4/1993 | Hogt et al. .................. 525/298 |
| 5,207,850 A | 5/1993 | Parekh ....................... 156/166 |
| 5,214,158 A | 5/1993 | Brunelle et al. ............. 549/267 |
| 5,225,129 A | 7/1993 | van den Berg ............... 264/85 |
| 5,231,161 A | 7/1993 | Brunelle et al. ............. 528/272 |
| 5,237,042 A | 8/1993 | Kim et al. ................... 528/279 |
| 5,241,880 A | 9/1993 | Mizobata et al. .......... 74/502.5 |
| RE34,431 E | 11/1993 | Brunelle et al. ............. 528/352 |
| 5,264,548 A | 11/1993 | Brunelle et al. ............. 528/370 |
| 5,281,669 A | 1/1994 | Kambour et al. ........... 525/177 |
| 5,288,837 A | 2/1994 | Munjal et al. ............... 528/198 |
| 5,300,392 A | 4/1994 | Odell et al. ................. 430/130 |
| 5,300,393 A | 4/1994 | Odell et al. ................. 430/134 |
| 5,300,590 A | 4/1994 | Cook et al. ................. 525/444 |
| 5,302,484 A | 4/1994 | Odell et al. ................. 430/127 |
| 5,314,779 A | 5/1994 | Odell et al. ................. 430/127 |
| 5,321,117 A | 6/1994 | Brunelle ..................... 528/272 |
| 5,340,909 A | 8/1994 | Doerr et al. ................. 528/276 |
| 5,348,985 A | 9/1994 | Pearce et al. ................ 521/124 |
| 5,356,984 A | 10/1994 | Carbone et al. ............. 524/431 |
| 5,386,037 A | 1/1995 | Takekoshi et al. .......... 549/206 |
| 5,387,666 A | 2/1995 | Takekoshi et al. .......... 528/283 |
| 5,389,719 A | 2/1995 | Takekoshi et al. .......... 524/784 |
| 5,407,984 A | 4/1995 | Brunelle et al. ............. 524/178 |
| 5,410,014 A | 4/1995 | Haese et al. ................ 528/196 |
| 5,420,226 A | 5/1995 | Hamer et al. ............... 528/201 |
| 5,434,244 A | 7/1995 | Warner et al. ............... 528/490 |
| 5,446,122 A | 8/1995 | Warner et al. ............... 528/279 |
| 5,466,744 A | 11/1995 | Evans et al. ................ 524/714 |
| 5,498,651 A | 3/1996 | Brunelle ..................... 524/176 |
| 5,508,343 A | 4/1996 | Holley ........................ 524/161 |
| 5,519,108 A | 5/1996 | Yuo et al. ................... 528/287 |
| 5,527,976 A | 6/1996 | Takekoshi et al. ............ 585/16 |
| 5,530,052 A | 6/1996 | Takekoshi et al. .......... 524/447 |
| 5,591,800 A | 1/1997 | Takekoshi et al. .......... 524/783 |
| 5,605,979 A | 2/1997 | Priddy, Jr. et al. .......... 525/439 |
| 5,637,655 A | 6/1997 | Priddy, Jr. et al. .......... 525/438 |
| 5,646,306 A | 7/1997 | Elsasser, Jr. ................ 549/267 |
| 5,648,454 A | 7/1997 | Brunelle ..................... 528/491 |
| 5,654,395 A | 8/1997 | Jackson et al. .......... 528/308.3 |
| 5,661,214 A | 8/1997 | Brunelle et al. ............. 524/783 |
| 5,663,282 A | 9/1997 | Todt et al. .................. 528/274 |
| 5,668,186 A | 9/1997 | Brunelle et al. .............. 521/48 |
| 5,693,722 A | 12/1997 | Priddy, Jr. et al. .......... 525/439 |
| 5,700,888 A | 12/1997 | Hall .......................... 526/190 |
| 5,707,439 A | 1/1998 | Takekoshi et al. .......... 106/483 |
| 5,710,086 A | 1/1998 | Brunelle et al. ............. 502/171 |
| 5,756,644 A | 5/1998 | Hodge et al. ............... 528/272 |
| 5,760,161 A | 6/1998 | Goins, Jr. et al. ........... 528/299 |
| 5,786,440 A | 7/1998 | Kohler et al. ............... 528/196 |
| 5,795,423 A | 8/1998 | Johnson ..................... 156/166 |
| 5,830,541 A | 11/1998 | Carswell et al. ............ 427/475 |
| 5,936,029 A | 8/1999 | Hall ........................... 524/572 |
| 5,965,686 A | 10/1999 | Blank et al. .................. 528/56 |
| 5,968,642 A | 10/1999 | Saito ....................... 428/304.4 |
| 6,080,834 A | 6/2000 | Putzig et al. ................ 528/279 |
| 6,121,466 A | 9/2000 | Osterholt et al. ........... 549/267 |
| 6,124,412 A * | 9/2000 | Bin-Taleb et al. .......... 526/159 |
| 6,211,316 B1 | 4/2001 | Seebach ..................... 526/266 |
| 6,271,317 B1 | 8/2001 | Halasa et al. ............. 525/333.1 |
| 6,284,868 B1 * | 9/2001 | Geprags et al. ............. 528/392 |
| 6,297,330 B1 | 10/2001 | Burch, Jr. et al. .......... 525/444 |
| 6,353,030 B1 | 3/2002 | Prikoszovich ............ 514/772.1 |
| 6,369,157 B1 * | 4/2002 | Winckler et al. ........... 524/783 |
| 6,376,026 B1 | 4/2002 | Correll et al. .............. 427/512 |
| 6,414,103 B1 | 7/2002 | Correll et al. ................ 528/25 |
| 6,420,047 B2 * | 7/2002 | Winckler et al. ........... 428/480 |
| 6,420,048 B1 | 7/2002 | Wang ........................ 428/480 |
| 6,436,548 B1 | 8/2002 | Phelps ....................... 428/480 |
| 6,436,549 B1 | 8/2002 | Wang ........................ 428/480 |
| 6,458,972 B1 | 10/2002 | Surburg et al. ............. 549/266 |
| 6,525,164 B2 | 2/2003 | Faler .......................... 528/279 |
| 6,586,558 B2 * | 7/2003 | Schmidt et al. ............. 528/271 |
| 6,639,009 B2 * | 10/2003 | Winckler et al. ........... 524/783 |

OTHER PUBLICATIONS

Okuda et al. "Synthesis and Characterization of Mononuclear Titanium Complexes Containing a Bis(phenoxy) Ligand Derived from 2,2'-Methylene-bis(6-tert-butyl-4-methylphenol)," *Chem. Ber.*, vol. 128, (1995) pp. 221–227.

Toth et al. "Towards supported catalyst models: the synthesis, characterization, redox chemistry, and structures of the complexes Ti(Oar')$_4$ (Ar'=C$_6$H$_4$(2-t-Bu), C$_6$H(2,3,5, 6-Me)$_4$)," *Canadian Journal of Chemistry*, vol. 69, (1991) pp. 172–178.

Youk et al. "Polymerization of Ethylene Terephthalate Cyclic Oligomers with Antimony Trioxide," *Micromolecules*, 33 (2000), pp. 3594–3599.

Beach, A. Christopher G. "The Preparation of Mirrors by Sputtering Metals onto Glass Surfaces," *A. Inst. P.*, Chelsea Polytechnic, M.S. received, Mar. 17, 1930.

Cussler et al. "Barrier Membranes," *Journal of Membrane Science*, 38 (1988) pp. 161–174.

Fukushima et al. "Graphite Nanoplatelets as Reinforcements for Polymers: Structural Electrical and Thermal Properties," *Proc. 2nd Ann., Automotive Comp. Conf., Soc. Plast. Eng.*, Sep. 2002, 7 pgs.

Fukushima et al. "Synthesis of an Intercalated Compound of Montmorillonite and 6–Polyamide," *Journal of Inclusion Phenomena*, 5 (1987) pp. 473–483.

Hall et al. "Recent research on the synthesis and applications of cyclic oligomers," *Reactive & Functional Polymers*, 41 (1999), pp. 133–139.

Ruddick et al. "A new method for the polymer–suported synthesis of cyclic oligoesters for potential applications in macrocyclic lactone synthesis and combinatorial chemistry," *J. Chem. Soc., Perkin Trans. 1*, 2002, pp. 627–637.

Spanagel et al. "Macrocyclic Esters," Contribution No. 153 from The Experimental Station of E.I. duPont deNemours & Company, vol. 57, pp. 929–934.

Uhi et al. "Flame Retarduncy of Graphite Nanocomposites," *Polym. Mater. Sci. Eng.* 83:56(2000).

Usuki et al. "Swelling behavior of montmorillonite cation exchanged for ω–amino acids by ε–caprolactam," *J. Mater. Res.*, vol. 8, No. 5, May 1993, pp. 1174–1178.

Usuki et al. "Synthesis of nylon 6–clay hybrid," J. Mater. Res., vol. 8, No. 5, May 1993, pp. 1179–1184.

Ward et al. "Gas barrier improvement using vermiculite and mice in polymer films," *Journal of Membrane Science*, 55 (1991) pp. 173–180.

Xiao et al. "Preparation of exfoliated graphite/polyestrene composite by polymerization–filling technique," *Polymer*, 42 (2001) pp. 4813–4816.

Ahjopalo, L. et al. (2000) "Cyclic Oligomers in Saturated Polyesters", Polymer, vol. 41, No. 23, 8283–8290.

Brunelle (1995) "Macrocycles For The Synthesis of High Molecular Weight Polymers" pp. 197–235, ch. 6, New Methods of Polymer Synthesis: Vol. 2, edited by J.R. Ebdon and G.C. Eastmond.

Brunelle et al. (1998) "Semicrystalline Polymers via Ring–Opening Polymerization: Preparation and Polymerization of Alkylene Phthalate Cyclic Oligomers" *Macromolecules* vol. 31, 4782–4790.

Burch, R. R. et al. (2000) "Synthesis of Cyclic Oligoesters and Their Rapid Polymerization to High Molecular Weight" Macromolecules, vol. 33, No. 14, 5053–5064.

Cotton, N. J. et al. (1993) "Rate and Extent of Supercritical Fluid Extraction of Cyclic Trimer from Poly(Ethylene Terephthalate) at Elevated Temperatures" *Journal of Chromatographic Science*, vol. 31, No. 5, 157–161.

Hamilton et al. (1998) "Cyclic Polyesters: Part 8. Preparation and Characterization of Cyclic Oligomers in Six Aromatic Ester and Ether–Ester Systems," *Polymer* vol. 39, No. 14., 3241–3252.

Harrison, A. G. et al. (1997) "Analysis of cyclic oligomers of poly(ethylene terephthalate) by liquid chromatography/mass spectrometry" Polymer communications, vol. 38, No. 10, 2549–2555.

Henshaw et al. (1994) "Recycling of a Cyclic Thermoplastic Composite Material by Injection and Compression Molding" *J. of Thermoplastic Composite Materials* vol. 7 (1), 14–29.

Hubbard, P. A. (1996) "Polyesters via Macrocyclic Oligomers" Dissertation presented at the University of Akron.

Kricheldorf, H. R. et al. (1997) "Macrocycles IV. Macrocyclic Polylactones as Bifunctional Monomers for Polycondensations" *Journal of Polymer Science*, vol. 36, No. 9, 1373–1378.

Kricheldorf, H. R. et al. (1998) "Macrocycles. 3. Telechelic Polylactones via Macrocyclic Polymerization" Macromolecules, vol. 31, No. 3, 614–620.

Lattimer et al. (1998) "MALDI–MS Analysis of Pyrolysis Products From a Segmented Polyurethane" *Journal of Analytical and Applied Pyrolysis*, vol. 48, 1–15.

Liu et al. (1999) "Preparation of Cyclic Polyester Oligomers and Ultra–low VOC Polyester Coatings" *Polymer Preprints*, vol. 40, No. 1.

Martin et al. (1987) "Pultrusion", *Engineered Materials Handbook: vol. 1 Composites*, pp. 533–543.

Miller, S. (1998) "Macrocyclic polymers from cyclic oligomers of poly(butylene terephthalate)" Dissertation Presented at University of Massachusetts, Amherst, MA US.

Mueller, F. J. et al. (1983) "Synthesis of Cyclic Oligomers of Butylene Terephthalate" *Makromol. Chem.*, vol. 184, No. 12, 2487–95.

Mueller, F. J. et al. (1983) "Synthesis of Cyclic Oligomers of Butylene Terephthalate" *Makromol. Chem.*, vol. 184, No. 12, 2487–95. (Translation).

Perovic, A. (1985) "Morphological Instability of poly(ethylene terephthalate) cyclic oligomer crystals" *Journal of Material Science*, vol. 20, Iss. 4, 1370–1374.

Perovic et al. (1982) "Crystallization of Cyclic Oligomers in Commercial Poly(ethleneterephthalate) Films" *Polymer Bulletin* vol. 6, 277–283.

Roelens, S. (1988) "Organotin–Mediated Synthesis of Macrocyclic Polyesters: Mechanism and Selectivity in the Reaction of Dioxastannolanes with Diacyl Dichlorides" *Journal of the Chemical Society, Perkin Transactions 2*, vol. 8, 1617–1625.

Deleuze et al. (1998) "Polymer–Supported Titanates as Catalysts for Transesterification Reactions" *Polymer*, vol. 39, No. 24, pp. 6109–6114.

Deleuze et al. (2000) "Synthesis of Porous Supports Containing N–(p–hydroxyphenyl)– or N–(3–4–dihydroxybenzyl) Maleimide–Anchored Titanates and Application as Catalysts for Transesterification and Epoxidation Reactions" *Journal of Polymer Science*, vol. 38, pp. 2879–2886.

"DuPont™ Tyzor® Organic Titanates General Brochure" (2001) E.I. du Pont de Nemours and Company, 12 pages.

Lewis et al. (1999) "A Highly Efficient Preparation of Methacrylate Esters using Novel Solid Phase Titanium–Based Transesterification Catalysts" *Synlett*, pp. 957–959.

Lancaster Results, Titanium (IV), http://www.lancastersynthesis.com/home_quick_search.htm; pp. 1–3 downloaded on Nov. 29, 2001; last searched on Apr. 22, 2002 and pp. 4–8 downloaded on Apr. 22, 2002.

Product Detail and structure Image, Titanium (IV) butoxide, polymer, http://www.sigmaaldrich.com/cgi–in/hsrun/Distributed/HahtShop/HahtShop.htx;start=HS_FramesetMain; last searched on Mar. 27, 2002 and pp. 1–2 downloaded on Mar. 27, 2002.

Brunelle et al. (1997) "Semi–crystalline Polymers via Ring–Opening Polymerization: Preparation and Polymerization of Alkylene Phthalate Cyclic Oligomers" *Polymers Preprints* vol. 38, No. 2, pp. 381–382.

Lui et al. (1999) "Preparation of Cyclic Polyester Oligomers and Ultra–Low VOC Polyester Coatings" *Polymer Reprints*, vol. 40, No. 1, pp. 137–138.

* cited by examiner

POLYMER-CONTAINING ORGANO-METAL CATALYSTS

TECHNICAL FIELD

This invention generally relates to catalysts. More particularly, the invention relates to polymer-containing organo-metal catalysts useful in the polymerization of macrocyclic oligoesters.

BACKGROUND INFORMATION

Linear polyesters such as poly(alkylene terephthalate) are generally known and commercially available where the alkylene typically has 2 to 8 carbon atoms. Linear polyesters have many valuable characteristics including strength, toughness, high gloss, and solvent resistance. Furthermore, polyesters may be fabricated into articles of manufacture by a number of well-known techniques including injection molding, roto-molding, and extrusion.

Recently, macrocyclic oligoesters were developed as precursors to polyesters. Macrocyclic oligoesters exhibit low melt viscosity, which can be advantageous in certain applications. Furthermore, certain macrocyclic oligoesters melt and polymerize at temperatures well below the melting point of the resulting polymer. Upon melting and in the presence of an appropriate catalyst, polymerization and crystallization can occur virtually isothermally.

Catalysts that may be used in the polymerization of macrocyclic oligoesters include various organo-metal compounds, including conventional, non-polymer-containing organotin compounds and titanate esters. It is desirable to have organotin compounds and titanate esters that are less moisture sensitive so that they may be stored and handled with ease in ambient air. Such catalysts are more suitable for preparing a stable and easy-to-handle blend material of a macrocyclic oligoester and a polymerization catalyst (i.e., a one-component ready-to-use mixture).

Furthermore, the required volume ratio of a macrocyclic oligoester to a conventional catalyst (e.g., organotin compounds or titanate esters) is very high, typically greater than 100:1. See, e.g., U.S. Pat. No. 5,466,744 to Evans et al. The high volume ratio requires sophisticated and costly metering and mixing equipment to properly introduce and disperse the relatively small amount of catalyst. This is of particular concern in liquid molding applications.

SUMMARY OF THE INVENTION

Novel polymer-containing organo-metal catalysts have been prepared that are much less sensitive to moisture and that have much larger molar volume and much greater molecular weight. Such polymer-containing organo-metal catalysts are particularly useful for the polymerization of macrocyclic oligoesters in liquid molding applications. In addition, these catalysts are well-suited for preparing a blend material of a macrocyclic oligoester and a catalyst where the blend is stable at ambient storage conditions.

In one aspect, the invention is directed to a polymer-containing catalyst that includes a compound of the formula $$(R^1-Y^1-)_i\text{-M}-(Y^2-R^2)_j.$$

Each $R^1$ may be an alkyl group or an alkyl ether group, each having between 1 and 20 carbon atoms. Additionally, two or more $R^1$ groups may be attached, thereby forming either an alkyl group or an alkyl ether group having between 1 and 20 carbon atoms. Each $R^2$ independently is a polymeric group containing 25 or more carbon atoms, and at least one $R^2$ includes a polyalkylene group of 25 or more carbon atoms, a polyether group, or both. In addition, i is an integer equal to or greater than zero, while j is an integer equal to or greater than one. Each $Y^1$ and $Y^2$ is either a single bond or a heteroatom selected from the group consisting of O, S, and N. M is a metal-containing group, and may be Ti, Sn, or $-Z^1-(X)_k-Z^2-$, where each of $Z^1$ and $Z^2$ independently is Ti or Sn, and each X independently is O or O—$R^3$—O, where $R^3$ is an alkylene group, and k is 1, 2, or 3.

In another aspect, the invention is directed to a polymer-containing catalyst that is prepared by chemically bonding a titanium-based catalyst or a tin-based catalyst with one or more polymeric groups. Each of the one or more polymeric groups contains 25 or more carbon atoms. One or more of the polymeric groups includes a polyalkylene group that has 25 or more carbon atoms, a polyether group, or both.

In yet another aspect, the invention is directed to a polymer-containing catalyst having the molecular formula $$\text{Ti}-(\text{OR})_4,$$

where each R independently is a polymeric group having 25 or more carbon atoms.

In yet another aspect, the invention is directed to a polymer-containing catalyst having the molecular formula $$(R^1-)_2-\text{Sn}-(\text{OR}^2)_2.$$

Each $R^1$ independently is, or two $R^1$ groups taken together are, an alkyl group or an alkyl ether group each having between 1 and 20 carbon atoms. Each $R^2$ independently is a polymeric group having 25 or more carbon atoms.

In yet another aspect, the invention is directed to a method of preparing a polymer-containing organo-metal catalyst. The method generally includes the steps of providing an organo-metal compound that contains an alkoxy metal moiety; providing a polymer containing 25 or more carbon atoms, a hydroxyl group, and a polyalkylene group and/or a polyether group; and contacting the organo-metal compound and the polymer at an elevated temperature. The chemical reaction between the alkoxy metal moiety of the organo-metal compound and the hydroxyl group of the polymer produces the polymer-containing catalyst.

In yet another aspect, the invention is directed to a blend material that contains a macrocyclic oligoester and a polymerization catalyst. The macrocyclic oligoester includes a structural repeat unit of the formula

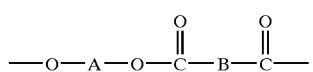

where A is an alkylene, a cycloalkylene, or a mono- or polyoxyalkylene group; and B is a divalent aromatic or alicyclic group. The polymerization catalyst contains a polymeric group that has 25 or more carbon atoms.

In yet another aspect, the invention is directed to a method for polymerizing a macrocyclic oligoester. The method includes the step of contacting a macrocyclic oligoester and a polymerization catayst at an elevated temperature. The polymerization catalyst has a polymeric group with at least 25 carbon atoms.

In yet another aspect, the invention is directed to a method for polymerizing a macrocyclic oligoester. The method includes the steps of providing a molten macrocyclic oligoester in a mold; providing a molten polymerization catalyst in the mold; and contacting the molten macrocyclic oligoester and the molten polymerization catalyst inside the mold, thereby causing polymerization of the macrocyclic oligoester. The polymerization catalyst contains a polymeric group having 25 or more carbon atoms.

In yet another aspect, the invention is directed to a polymer-containing catalyst that is prepared by bonding a catalyst with one or more polymeric groups. Each of the one or more polymeric groups contains 25 or more carbon atoms. One or more of the polymeric groups includes a polyalkylene group that has 25 or more carbon atoms, a polyether group, or both.

DESCRIPTION

According to the present invention, polymer-containing catalysts (e.g., polymer-containing organo-metal catalysts) are prepared that are useful in various applications (e.g., for polymerizing macrocyclic oligoesters). The use of these new catalysts in polymerization reactions offers various advantages over the previous use of non-polymer-containing catalysts, including the improved ability to store and handle the catalyst in open air, increased molar volume and molecular weight of the catalyst, and the improved ability to prepare, store, and handle a blend of reactants and the catalyst (e.g., a macrocyclic oligoester and a polymerization catalyst) for subsequent one-step reaction (e.g., polymerization of macrocyclic oligoesters).

Definitions

The following general definitions may be helpful in understanding the various terms and expressions used in this specification.

As used herein, a "macrocyclic" molecule means a cyclic molecule having at least one ring within its molecular structure that contains eight or more atoms covalently connected to form the ring.

As used herein, an "oligomer" means a molecule that contains two or more identifiable structural repeat units of the same or different formula.

As used herein, an "oligoester" means a molecule that contains two or more identifiable ester functional repeat units of the same or different formula.

As used herein, a "macrocyclic oligoester" means a macrocyclic oligomer containing two or more identifiable ester functional repeat units of the same or different formula. A macrocyclic oligoester typically refers to multiple molecules of one specific formula having varying ring sizes. However, a macrocyclic oligoester may also include multiple molecules of different formulae having varying numbers of the same or different structural repeat units. A macrocyclic oligoester may be a co-oligoester or multi-oligoester, i.e., an oligoester having two or more different structural repeat units having an ester functionality within one cyclic molecule.

As used herein, a "blend material" is understood to mean a mixture of two or more components including at least one macrocyclic oligoester and at least one polymerization catalyst. Preferably the blend material is uniformly mixed. A blend material may also include a filler as well as other components recognized by a skilled artisan.

As used herein, a "polymeric group" means a group of high relative molecular mass, the structure of which essentially contains the multiple repetition of units (i.e., monomers) derived, actually or conceptually, from molecules of low relative molecular mass.

As used herein, a "polymer-containing catalyst" means a catalyst wherein one or more polymeric groups are chemically bonded, directly or indirectly, to the active center of the catalyst.

As used herein, a "co-polymeric group" means a polymeric group derived from two or more species of monomer.

As used herein, an "alkylene group" means substituted or unsubstituted —$C_nH_{2n}$—, where $2 \leq n \leq 15$.

As used herein, a "polyalkylene group" means a polymeric group where the monomer(s) is one or more alkylene units such as substituted or unsubstituted —$C_nH_{2n}$— where n>20. One or more H's may be substituted by, for example, an alkyl group, a halogen, a hydroxyl, or an alkoxy group. Illustrative examples of polyakylene groups include polyethylene, polybutylene, polyisopropylene, and copolymers thereof.

As used herein, an "alkyl ether group" means two alkyl groups linked together by an oxygen atom.

As used herein, a "polyether group" means a polymeric group wherein the monomer(s) is one or more ether units such as a diethyl ether. Illustrative examples of polyether groups include polydiethylether groups, polymethylethylether groups, and co-polymers thereof.

As used herein, an "alicyclic group" means a non-aromatic hydrocarbon group containing a cyclic structure.

As used herein, a "cycloalkylene group" means a cyclic alkylene group, —$C_nH_{2n-x}$—, where x represents the number of H's replaced by cyclization(s).

As used herein, a "mono- or polyoxyalkylene group" means $[-(CH_2)_m-O-]_n-(CH_2)_m-$, wherein n is an integer greater than zero and m is an integer greater than one.

As used herein, a "divalent aromatic group" means an aromatic group with two links to other parts of the macrocyclic molecule. For example, a divalent aromatic group may include a meta- or para-linked monocyclic aromatic group (e.g., benzene).

As used herein, an "acyclic group" is a group which does not contain a cyclic molecular structure.

As used herein, an "alkoxy metal moiety" means a moiety containing a metal atom where the metal atom is chemically bonded to an oxygen atom, which in turn is bonded to an alkyl group. Illustrative examples of alkoxy metal moieties include Ti—O-isopropyl and Sn—O-n-butyl.

As used herein, a "filler" means a material other than a macrocyclic oligoester or a polymerization catalyst that may be included in the blend material. A filler may be included to achieve a desired purpose or property, and may be present in the resulting polyester polymer. Purposes include providing chemical, thermal, or light stability; providing weight or bulk; providing flame resistance; substituting a more expensive material; facilitating processing; and/or providing other desirable properties as recognized by a skilled artisan. Illustrative examples of fillers are, among others, fumed silica, titanium dioxide, calcium carbonate, chopped fibers, fly ash, glass microsphperes, micro-balloons, crushed stone, nanoclay, linear polymers and monomers, and combinations thereof.

I. Polymer-Containing Organo-Metal Catalysts

Generally, a catalyst is any substance that increases the rate of a chemical reaction without itself being substantially consumed. Illustrative examples of catalysts include metals, alloys, and intermetallic compounds; oxides; salts; sulfides; acids; bases; bifunctional compounds; organic ion exchangers; metal coordination complexes (e.g., Ziegler-Natta catalysts); zeolites; and enzymes. Catalysts may be supported, unsupported, precipitated, impregnated, skeletal, fused, molten, dried, calcinated, and reduced, for instance. Illustrative examples of chemical reactions that may be catalyzed by one or more catalysts include polymerization reactions, depolymerization reactions, transesterification reactions, radical chain reactions, and nucleophilic substitution reactions.

Conventional organo-metal catalysts that may be suitable for use in the polymerization of macrocyclic oligoesters include, for example, various titanate esters, such as tetraisopropyl titanate, and various organotin compounds, such as di-n-butyltin(IV) oxide. Certain other organo-metal catalysts that may be suitable for use in the polymerization of macrocyclic oligoesters have a more complex molecular structure, such as dimeric or trimeric stannoxanes.

Generally, polymer-containing organo-metal catalysts can provide improvement in catalyst performance and utility, including, for example, reduced sensitivity to moisture, increased molecular weight and molar volume, and increased catalytic stability as a component in a blend material with a macrocyclic oligoester.

In one aspect, the invention is directed to a polymer-containing catalyst that includes a compound of the molecular formula

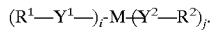

Each $R^1$ is either an alkyl group or an alkyl ether group, each having between 1 and 20 carbon atoms. The alkyl group and the alkyl ether group may be branched or unbranched, cyclic or acyclic, and substituted or unsubstituted. $R^1$ may contain substitution groups including halogens, hydroxyl, ketone, and alkoxy groups, for example. Additionally, two or more $R^1$ groups may be attached to form either an alkyl group or an alkyl ether group having between 1 and 20 carbon atoms. Illustrative examples of alkyl groups include methyl, ethyl, propyl, isopropyl, n-butyl, isobutyl, and pentyl groups. Illustrative examples of alkyl ether groups include diethyl ether, methyl-ethyl ether, methyl-n-propyl ether, methyl-isopropyl ether, and di-n-butyl ether groups.

Each $R^2$ independently is a polymeric group containing 25 or more carbon atoms. At least one $R^2$ includes a polyalkylene group having 25 or more carbon atoms, a polyether group, or both. Illustrative examples of polyalkylene groups include polyethylene, polypropylene, polyisopropylene, polybutylene, polyisobutylene groups, and co-polyalkylenes thereof. Illustrative examples of polyether groups include polyalkylene glycol groups such as polyethylene glycol, polypropylene glycol, polybutylene glycol, and co-polyether groups thereof. In certain embodiments, $R^2$ is a co-polymeric group of two or more of the polyalkylene and/or polyether groups. For instance, $R^2$ may be a copolymeric group of polyethylene and poly(ethylene glycol). The polyalkylene groups and the polyether groups may be branched or unbranched, cyclic or acyclic, substituted or unsubstituted. In addition, $R^2$ may be a random co-polymeric group or a block co-polymeric group.

The compound of the above formula contains at least one polymer-containing branch. Thus, i is an integer equal to or greater than zero, while j is an integer equal to or greater than one. In certain embodiments, the sum of i and j is 4. In exemplary embodiments, combinations of i and j include, i=0 and j=4; i=1 and j=3; i=2 and j=2; and i=3 and j=1. In other embodiments, the sum of i and j is 6. In exemplary embodiments, combinations of i and j include i=0 and j=6; i=1 and j=5; i=2 and j=4; i=3 and j=3; i=4 and j=2; and i=5 and j=1.

Each $Y^1$ and $Y^2$ is a single bond or a heteroatom selected from the group consisting of O, S, and N. The single bond may be a covalent bond or a non-covalent bond. M is a metal-containing group, and may be Ti, Sn, or $-Z^1-(X)_k-Z^2-$. In the latter group, each of $Z^1$ and $Z^2$ independently is Ti or Sn; each X is O or $-O-R^3-O-$, where $R^3$ is an alkylene group; and k is 1, 2, or 3. $R^3$ may be branched or unbranched, cyclic or acyclic, substituted or unsubstituted. Illustrative examples of $R^3$ include a methylene group, an ethylene group, a propylene group, and an n-butylene group. For instance, when k is 2, X is $-O-R^3-O-$, $R^3$ is an ethylene group, and $Z^1$ and $Z^2$ are each Ti, the corresponding $-Z^1-(X)_k-Z^2-$group would be $-Ti-(O-CH_2-CH_2-O)_2-Ti-$.

In one embodiment, the portion of the molecular formula, $(R^1-Y^1-)_i$, represents one or more branches of an original organo-metal catalyst remaining after a reaction to attach via a substitution or a coupling reaction, for example, one or more polymer-containing branches. The polymer-containing branch or branches are represented by the portion of the molecular formula $(-Y^2-R^2)_j$.

In certain embodiments, the polymer-containing catalyst is a mixture of compounds, at least one of which has the molecular formula:

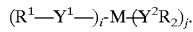

In certain embodiments, the polymer-containing catalyst is a mixture of compounds, each of which has the above molecular formula. In other embodiments, the polymer-containing catalyst is a mixture of compounds, at least one of which does not have the above molecular formula.

In general, in another aspect, embodiments of the invention feature a polymer-containing catalyst prepared by chemically bonding a titanium-based catalyst or a tin-based catalyst with one or more polymeric groups. Each of the one or more polymeric groups contains 25 or more carbon atoms. At least one of the one or more polymeric groups contains a polyalkylene group having 25 or more carbon atoms, a polyether group, or both.

Illustrative examples of polyalkylene groups include polyethylene, polypropylene, polybutylene, polyisopropylene, polyisobutylene, and co-polyalkylene groups thereof. Illustrative examples of polyether groups include polyalkylene glycol groups such as polyethylene glycol, polypropylene glycol, polybutylene glycol, and co-polyether groups thereof. In some embodiments, $R^2$ is a co-polymeric group of two or more of the polyalkylene and/or polyether groups. For instance, $R^2$ may be a co-polymeric group of polyethylene and poly(ethylene glycol). The polyalkylene group and the polyether group may be branched or unbranched, cyclic or acyclic, substituted or unsubstituted.

The chemical bond between the Ti-based or Sn-based catalyst and the one or more polymeric groups may be a covalent bond or a non-covalent bond, a single bond or a multiple bond, a bond between a metal atom and a non-metal atom, or a bond between two non-metal atoms. The chemical bond may be formed by any chemical reaction, such as a substitution or a coupling reaction.

Illustrative examples of conventional (i.e., non-polymer-containing) titanium-based catalysts that may be convertible to polymer-containing catalysts include tetraisopropyl titanate, tetra(2-ethylhexyl) titanate, and tetrabutyl titanate. Illustrative examples of conventional tin-based catalysts that may be modified to become polymer-containing catalysts include stannous ethoxide, stannous propoxide, n-butyltin (IV) chloride dihydroxide, dialkyltin(IV) oxides (e.g., di-n-butyltin(IV) oxide, di-n-octyltin(IV) oxide), acyclic and cyclic monoalkyltin(IV) derivatives (including n-butyltin tri-n-butoxide), acyclic and cyclic dialkyltin(IV) dioxides (including di-n-butyltin(IV) di-n-butoxide and heterocyclic analogues thereof, such as 2,2-di-n-butyl-2-stanna-1,3 dioxacycloheptane), 1,1,6,6-tetra-n-butyl-1,6-distanna-2,5, 7,10-tetraoxacyclodecane, and trialkyltin alkoxides (e.g., tributyltin ethoxide).

Table 1 and Table 2 contain additional illustrative examples of conventional titanium-based and tin-based catalysts, respectively, that may be modified to include polymeric groups.

TABLE 1

Titanium-based Catalysts

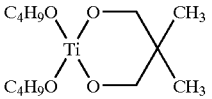

Di-1-butyl 2,2-dimethylpropane-
1,3-dioxytitanate

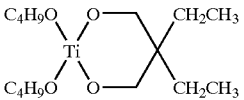

Di-1-butyl 2,2-diethylpropane-
1,3-dioxytitanate

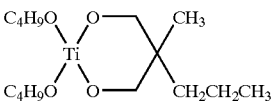

Di-1-butyl 2(1-propyl)-2-
methylpropane-1,3-dioxytitanate

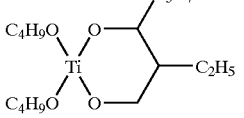

Di-1-butyl 2-ethylhexane-
1,3-dioxytitanate

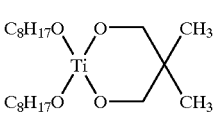

Di(2-ethyl-1-hexyl) 2,2-dimethylpropane-
1,3-dioxytitanate

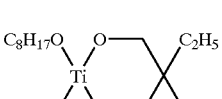

Di(2-ethyl-1-hexyl) 2,2-diethylpropane-
1,3-dioxytitanate

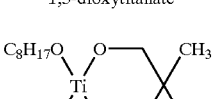

Di(2-ethyl-1-hexyl) 2-(1-propyl)-2-
methylpropane-1,3-dioxytitanate

TABLE 1-continued

Titanium-based Catalysts

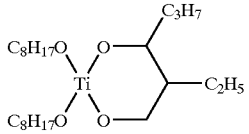

Di(2-ethyl-1-hexyl) 2-ethylhexane-
1,3-dioxytitanate

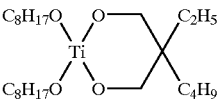

Di(2-ethyl-1-hexyl) 2-(1-butyl)-2-
ethylpropane-1,3-dioxytitanate

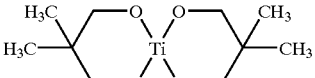

Bis(2,2-dimethyl-1,3-propylene) titanate

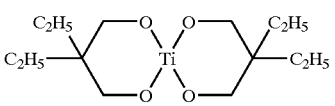

Bis(2,2-diethyl-1,3-propylene) titanate

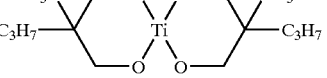

Bis(2-(1-propyl)-2-methyl-1,3-propylene) titanate

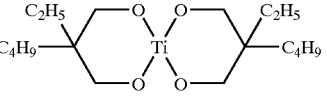

Bis(2-(1-butyl)-2-ethyl-1,3-propylene) titanate

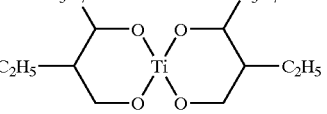

Bis(2-ethyl-1,3-hexylene) titanate

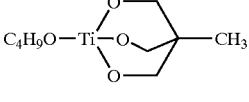

1-(1-Butoxy)-4-methyl-2,6,7-trioxa-
1-titanabicyclo[2,2,2]octane

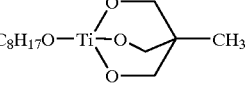

1-(2-ethyl-1-hexoxy)-4-methyl-2,6,7-trioxa-
1-titanabicyclo[2,2,2]octane

TABLE 1-continued

Titanium-based Catalysts

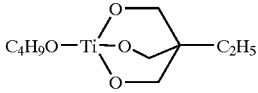

1-(1-Butoxy)-4-ethyl-2,6,7-trioxa-
1-titanabicyclo[2,2,2]octane

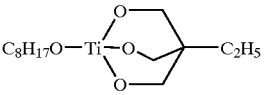

1-(2-ethyl-1-hexoxy)-4-ethyl-2,6,7-trioxa-
1-titanabicyclo[2,2,2]octane

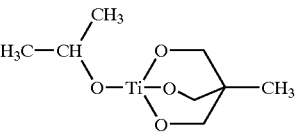

1-(2-Propoxy)-4-ethyl-2,6,7-trioxa-
1-titanabicyclo[2,2,2]octane

TABLE 2

Tin-based Catalysts dimeric and trimeric stannoxanes of the general formulas:

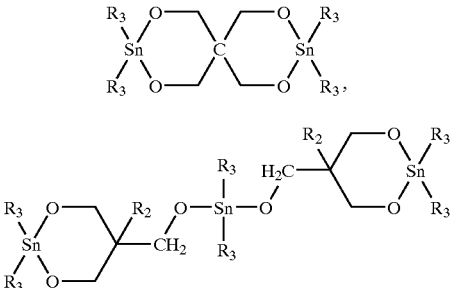

where $R_2$ is a $C_{1-4}$ primary alkyl group and $R_3$ is a $C_{1-10}$ alkyl group.

In yet another aspect, the invention features a polymer-containing catalyst having the molecular formula $$Ti{-}(OR)_4,$$

where each R independently is a polymeric group containing 25 or more carbon atoms.

Illustrative examples of R groups include polymeric groups such as polyalkylene groups, polyether groups, polyester groups, polycarbonate groups, and polystyrene groups. In one embodiment, at least one R is a polyalkylene group containing 25 or more carbon atoms. Illustrative examples of polyalkylene groups include polyethylene, polypropylene, polyisopropylene, poly-n-butylene, polyisobutylene, and co-polyalkylene groups thereof. In another embodiment, each of the four R groups is a polyethylene group.

In another embodiment, at least one R is a polyether group containing 25 or more carbon atoms. Illustrative examples of polyether groups include polyalkylene glycol groups such as polyethylene glycol, polypropylene glycol, polybutylene glycol, and co-polyether groups thereof. In some embodiments, R is a co-polymeric of two or more of the polyalkylene and/or polyether groups. For instance, R may be a co-polymeric group of polyethylene and poly(ethylene glycol).

Each R (e.g., a polyalkylene group or a polyether group) independently may be branched or unbranched, cyclic or acyclic, substituted or unsubstituted. Also, R may be a random co-polymeric group such as a poly(ethylene-ran-1,2-butylene) group, or block co-polymeric group such as polyethylene-block-poly(ethylene glycol). The terms "ran" and "block" denote random co-polymer and block co-polymer, respectively. Each R may be different; or two, three, or all four R groups may be identical. In addition, the above formula encompasses a plurality of stereoisomers (both geometric and optical). For example, the chemical formula $(R^x)_2Ti(R^y)_2$ includes the embodiments of both of the following which have different arrangements of the $R^x$ and $R^y$ groups about the Ti atom:

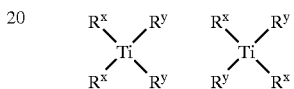

In still another aspect, embodiments of the invention feature a polymer-containing catalyst having the molecular formula

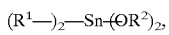

$$(R^1{-})_2{-}Sn{-}(OR^2)_2,$$

wherein each $R^1$ is either an alkyl group or an alkyl ether group having between 1 and 20 carbon atoms. Each $R^2$ is a polymeric group containing 25 or more carbon atoms.

Each $R^1$ (e.g., an alkyl group or an alkyl ether group) independently may be branched or unbranched, cyclic or acyclic, and substituted or unsubstituted. $R^1$ may contain substitution groups including halogens, hydroxyl, ketone, alkoxy, and amino groups. Additionally, two or more $R^1$ groups may be attached thereby forming either an alkyl group or an alkyl ether group having between 1 and 20 carbon atoms. Illustrative examples of alkyl groups include methyl, ethyl, propyl, isopropyl, n-butyl, isobutyl, and pentyl groups. Illustrative examples of alkyl ether groups include diethyl ether, methyl-ethyl ether, methyl-n-propyl ether, methyl-isopropyl ether, ethyl-t-butyl ether, and di-n-butyl ether groups.

Each $R^2$ is a polymeric group containing 25 or more carbon atoms. In one embodiment, at least one $R^2$ is a polyalkylene group containing 25 or more carbon atoms. Illustrative examples of polyalkylene groups include polyethylene, polypropylene, poly-n-butylene, polyisopropylene, polyisobutylene, and co-polyalkylene groups thereof. In another embodiment, each of the two $R^2$ groups is a polyalkylene group containing 25 or more carbon atoms.

In another embodiment, at least one $R^2$ is a polyether group. Illustrative examples of polyether groups include polyalkylene glycol groups such as polyethylene glycol, polypropylene glycol, polybutylene glycol, and co-polyether groups thereof. In certain embodiments, $R^2$ is a co-polymeric group of two or more of the polyalkylene and/or polyether groups. For instance, $R^2$ may be a co-polymeric group of polyethylene and poly(ethylene glycol).

A polyalkylene group and a polyether group may be branched or unbranched, cyclic or acyclic, substituted or unsubstituted. Also, $R^2$ may be a random co-polymeric group such as a poly(ethylene-ran-1,2-butylene) group, or block co-polymeric group such as polyethylene-block-poly (ethylene glycol). Each $R^2$ may be different, or two, three, or all four R groups may be identical. In addition, the above formula encompasses a plurality of stereoisomers (both geometric and optical). For instance, the chemical formula $(R^1)_2Sn(R^2)_2$ includes the embodiments of both of the following which have different arrangements of the $R^1$ and $R^2$ groups about the Sn atom:

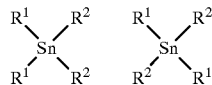

In certain embodiments, each $R^1$ is an alkyl group while each $R^2$ is a polyalkylene group or a polyether group. In other embodiments, each $R^1$ is an alkyl ether group while each $R^2$ is a polyalkylene group or a polyether group. In still other embodiments, one $R^1$ is an alkyl group and the other $R^1$ an alkyl ether group while one $R^2$ is a polyalkylene group and the other $R^2$ is a polyether group.

In another aspect, embodiments of the invention feature a method of preparing a polymer-containing catalyst. In one embodiment, the method includes the steps of providing an organo-metal compound that contains an alkoxy metal moiety; providing a polymer that contains 25 or more carbon atoms, a hydroxyl group, and at least one of a polyalkylene group and a polyether group; and contacting at an elevated temperature the organo-metal compound and the polymer. Without wishing to be bound by any particular theory, it is the chemical reaction between the alkoxy metal moiety of the organo-metal compound and the hydroxyl group of the polymer that results in a polymer-containing catalyst, although other explanations are possible.

In one embodiment of the invention, the organo-metal compound is an organo-titanium compound, and the alkoxy metal moiety is an alkoxy titanate moiety. Illustrative examples of the organo-metal compound include tetra-isopropyl titanate, tetra-n-butyl titanate, and di-isopropyl-di-n-butyl titanate. In another embodiment, the organo-metal compound is an organo-tin compound, and the alkoxy metal moiety is an alkoxy tin moiety. Such an embodiment may include, for example, stannous ethoxide as the organo-metal compound.

The organo-metal compound may contain more than one alkoxy metal moieties, which may be identical or different moieties. The organo-metal compound may contain two or more metal atoms. In one embodiment, the organo-metal compound contains both a titanium atom and a tin atom. Thus, there may be two or more types of alkoxy metal moieties based on the metal atom they contain. Illustrative examples of organo-metal compounds suitable for converting to polymer-containing catalysts may be selected from Tables 1 and 2 above.

The hydroxyl-functionalized polymer that may be employed in preparing polymer-containing catalysts includes branched or unbranched, cyclic or acyclic, substituted or unsubstituted polymeric groups having 25 or more carbon atoms. The hydroxyl-functionalized polymer contains a hydroxyl group, which may or may not be located at a terminal of the polymeric chain.

In one embodiment, the hydroxyl-functionalized polymer employed contains a polyalkylene group containing 25 or more carbon atoms. Illustrative examples of polyalkylene groups include polyethylene, polypropylene, poly-n-butylene, polyisopropylene, polyisobutylene, and co-polyalkylene groups thereof. In another embodiment, the hydroxyl-functionalized polymer contains a polyether group having 25 or more carbon atoms. Illustrative examples of polyether groups include polyalkylene glyocl groups such as polyethylene glycol, polypropylene glycol, polybutylene glycol, and co-polyether groups thereof. In certain embodiments, the hydroxyl-functionalized polymer is a co-polymeric group of two or more alkylene and/or ether monomers. For example, the polymer may be a random co-polymeric group such as a poly(ethylene-ran-1,2-butylene) group, or block co-polymeric group such as polyethylene-block-poly(ethylene glycol). The polyalkylene group and the polyether group may be branched or unbranched, substituted or unsubstituted, cyclic or acyclic. In addition, the hydroxyl-functionalized polymer may contains two or more hydroxyl groups.

The organo-metal compound and the hydroxyl-functionalized polymer may be separately dissolved in one or more solvents, then mixed. Alternatively, they may be dissolved one after another or simultaneously into a single solution. Any solvent may be used as long as it does not interfere with the preparation of the desired polymer-containing compound. Illustrative examples of solvents include toluene, o-xylene, chlorobenzene, and o-dichlorobenzene. Mixing of the organo-metal compound and/or the polymer with solvent(s) may be conducted under ambient air or under an inert environment, such as in nitrogen or argon.

The step of contacting the organo-metal compound and the hydroxyl-functionalized polymer typically is performed at an elevated temperature. However, the reaction proceeds at lower temperatures as long as one or more products are sufficiently removed (e.g., by applying sufficient vacuum to remove the alcohol produced in the reaction). In one embodiment, the contacting step is conducted at ambient temperature. In another embodiment, the contacting step is conducted at a temperature within a range from about 35° C. to about 260° C. In yet another embodiment, the step is conducted at a temperature within a range from about 100° C. to about 200° C. In yet another embodiment, the step is conducted at a temperature within a range from about 150° C. to about 200° C. Depending on the alcohol to be removed, the reaction temperature and pressure may be selected to effect removal of alcohol.

The above-described reaction may be conducted in any reaction vessel as long as the desired polymer-containing catalysts are obtained. In addition, the reaction may be run at various scales and concentrations. The reaction may be monitored by any means allowing assessment of the progress of the reaction including chromatography and measurement of the amount of alcohol liberated from the reaction between the organo-metal compound and the hydroxyl-functionalized polymer. After the desired degree of reaction is achieved, residue solvent may be removed by distillation with or without vacuum. Upon cooling, the polymer-containing organo-metal catalyst solidifies and can be converted into a powder form, e.g., by using a laboratory blender. The powdered catalyst may be blended with other materials such as a macrocyclic oligoester, as discussed hereinafter.

The yield of the polymer-containing organo-metal catalysts is typically in the range from about 95% of quantitative yield up to quantitative yield according to the hydroxyl-functionalized polymer. However, lower yields, such as yields around 60%, 70%, or 80%, may be desirable and can result depending on how reactions are carried out. In one embodiment, the yield of the polymer-containing organo-metal catalysts is in the range from about 95% to 99.9%. In another embodiment, the yield of the polymer-containing organo-metal catalysts is in the range from about 97% to 99.9%. In yet another embodiment, the yield of the polymer-containing organo-metal catalysts is in the range from about 98.5% to 99.9%.

The purity of the polymer-containing organo-metal catalysts is typically in the range from about 95% to about 99.9% by weight. However, lower purities, such as purities around 60%, 70%, or 80% by weight, may be adequate and can result depending on how reactions are carried out. In one embodiment, the purity of the polymer-containing organo-metal catalysts is in the range from about 95% to 99.9%. In another embodiment, the purity of the polymer-containing organo-metal catalysts is in the range from about 97% to 99.9%. In yet another embodiment, the purity of the polymer-containing organo-metal catalysts is in the range from about 98.5% to 99.9%.

Embodiments of the invention also include a mixture of reaction products prepared by the method discussed herein. In one embodiment, the molar ratio of the hydroxyl-functionalized polymer and the organo-metal compound is greater than 0 and less than or equal to 4. In other embodiments, the molar ratio of the polymer and the organo-metal compound is within a range from about 0.5 to about 3.5, from about 1.0 to about 3.0, from about 1.5 to about 2.5, and from about 2 to about 2.5. These embodiments include mixtures of reaction products in which there is incomplete attachment of polymer-containing units onto the metal. For instance, the mixture of reaction products may containing a mixture of compounds each having the general formula

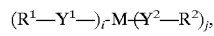

with various i and j combinations, as discussed herein.

In yet another aspect, embodiments of the invention feature a polymer-containing catalyst that is prepared by bonding a catalyst with one or more polymeric groups. Each of the one or more polymeric groups contains 25 or more carbon atoms. One or more of the polymeric groups includes a polyalkylene group that has 25 or more carbon atoms, a polyether group, or both. Although the description above focuses on the use of organo-metal catalysts, embodiments of the invention do include polymer-containing catalysts generally, even if they are not organo-metal catalysts.

Illustrative examples of catalysts that may be modified into polymer-containing catalysts include metals, alloys, and intermetallic compounds; oxides; salts; sulfides; acids; bases; bifunctional compounds; organic ion exchangers; metal coordination complexes (such as Ziegler-Natta catalysts); zeolites; and enzymes. Illustrative examples of catalysts may include catalysts which are supported, unsupported, precipitated, impregnated, skeletal, fused, molten, dried, calcinated, and reduced, for instance.

In some embodiments, the catalyst contains a metal. The metal may be one or more metallic elements and/or the oxides, sulfides, or halides of metallic elements or of the semimetallic elements boron, aluminum, and silicon. Metallic elements include alkali metals, alkali earth metals, transition metals, metalloids, and other metals.

II. Blend Material of Macrocyclic Oligoesters and Polymer-Containing Organo-Metal Catalysts In another aspect, the invention features a blend material including a macrocyclic oligoester and a polymerization catalyst of the invention, wherein the macrocyclic oligoester has a structural repeat unit of the formula

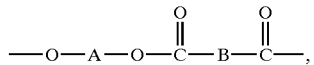

where A is an alkylene, a cycloalkylene, or a mono- or polyoxyalkylene group; B is a divalent aromatic or alicyclic group. The polymerization catalyst includes a polymeric group comprising 25 or more carbon atoms.

Illustrative examples of macrocyclic oligoesters in the above blend material include macrocyclic oligoesters of ethylene terephthalate, 1,4-butylene terephthalate, 1,3-propylene terephthalate, 1,4-cyclohexylenedimethylene terephthalate, 1,2-ethylene 2,6-naphthalendicarboxylate, and macrocyclic co-oligoesters containing two or more of the above or other monomer repeat units. An embodiment may use more than one of the above macrocyclic oligoesters. For instance, an embodiment may use mixtures macrocyclic oligoesters of 1,4-butylene terephthalate and ethylene terephthalate in preparing the blend material.

The polymerization catalyst that may be used in preparing the blend material may include any of the polymer-containing organo-metal catalysts discussed herein.

In one embodiment, the blend material also includes a filler. Illustrative examples of such fillers include pigments, light-weight fillers, flame retardants, and ultraviolet light stabilizers. For example, calcium carbonate may be used to increase the thickness of a polyester polymer product to improve its mechanical performance. Also, glass microspheres may be added to lower the density of the product. Other fillers include nanoclays, for instance, to increase the modulus of the product, organo bromides in combination with antimonium oxides, for example, to impart flame resistance, and colorants such as carbon black or titanium dioxide.

A blend material prepared according to the present invention typically has a relatively long shelf life and may be used in one-step polymerization processes. In one embodiment, the blend material has a shelf life of at least one week, preferably one to two months, most preferably six months to one year. The long shelf life allows more versatile production of polymer products from macrocyclic oligoesters. Sensitivity of the catalyst to moisture under storage conditions is diminished, and rapid polymerization takes place upon heating the blend material. Molding applications, for example, may be simplified and/or improved, because no mixing is required in the polymerization step. Processes in which these blends may be advantageously used include, for example, injection and rotational molding, resin film infusion, resin transfer molding, filament winding, powder coating to create a prepreg or film, hot melt prepreg preparation, compression molding, roll wrapping, water slurry, and pultrusion, with or without reinforcement.

In certain embodiments, the volume ratio of the macrocyclic oligoester to the polymerization catalyst in the blend material is within a range from about 2:1 to about 50:1, from about 5:1 to about 40:1, from about 5:1 to about 30:1, from about 10:1 to about 30:1, and from about 10:1 to about 20:1. The relatively high molar volume and/or molecular weight of the polymer-containing catalyst allows the use of lower ratios of macrocyclic oligoester to polymerization catalyst than would be possible using conventional, non-polymer-containing catalysts. There are many applications in which this would be advantageous. For example, in liquid injection molding applications, metering and mixing of a small amount of catalyst evenly into a relatively large amount of macrocyclic oligoester may require sophisticated and costly metering and mixing equipment, or it may be prohibitively expensive or impractical. With a lower volume ratio of macrocyclic oligoester to catalyst, it is easier to properly mix and distribute the polymerization catalyst throughout the mold.

III. Polymerization of Macrocylic Oligoesters

In yet another aspect, the invention features a method for polymerizing a macrocyclic oligoester using a polymer-containing organo-metal catalyst of the invention. The method includes the step of contacting, at an elevated temperature, a macrocyclic oligoester and a polymerization catalyst having a polymeric group with 25 or more carbon atoms.

Preferably, the macrocyclic polyester oligomer is polymerized by heating the macrocyclic polyester oligomer and catalyst to an elevated temperature. Often the macrocyclic polyester oligomer is heated to above its melting point so it becomes less viscous and can be manipulated easier in processing. Subsequently, the temperature may be maintained or increased to initiate and complete the polymerization reaction. In some embodiments, the macrocyclic polyester oligomer and catalyst are heated to a temperature from about 130° C. to about 250° C., from about 160° C. to about 220° C., and from about 180° C. to about 190° C. to initiate and complete polymerization. Stirring may be employed under an inert atmosphere in order to enhance polymerization of the macrocyclic polyester oligomer to produce the desired polyester polymer. In one embodiment, the polymerization is conducted under air atmosphere. In another embodiment, the polymerization is conducted under inert atmosphere.

Illustrative examples of macrocyclic oligoesters include macrocyclic oligoesters of ethylene terephthalate, 1,4-butylene terephthalate, 1,3-propylene terephthalate, 1,4-cyclohexylenedimethylene terephthalate, 1,2-ethylene 2,6-naphthalendicarboxylate, and macrocyclic co-oligoesters based on two or more of the above or other monomer repeat units. The polymerization catalyst may include any of the polymer-containing organo-metal catalysts discussed herein.

In one embodiment, two or more species of macrocyclic oligoesters may be polymerized together, for example, the mixture of macrocyclic oligoesters of butylene terephthalate and of ethylene terephthalate. In one embodiment, the macrocyclic oligoester and the polymerization catalyst are components of a blend material.

In yet another aspect, the invention features a method for polymerizing a macrocyclic oligoester. The method includes the steps of providing a molten macrocyclic oligoester; providing a molten polymerization catalyst of the invention; and contacting the molten macrocyclic oligoester and the molten polymerization catalyst, thereby causing polymerization of the macrocyclic oligoester. The polymerization catalyst contains a polymeric group having 25 or more carbon atoms.

In some embodiments, the step of contacting the molten macrocyclic oligoester and the molten polymerization catalyst first takes place in a mold. In other embodiments, the step of contacting the molten macrocyclic oligoester and the molten polymerization catalyst first takes place outside of a mold. In some embodiments, the step of providing a molten macrocyclic oligoester is performed by injecting the molten macrocyclic oligoester into a mold and the step of providing a molten polymerization catalyst is performed by injecting molten polymerization catalyst into the mold. The steps of injecting a molten macrocyclic oligoester into the mold and injecting a molten polymerization catalyst into the mold may be done with any suitable injection equipment and in any order including injecting a molten macrocyclic oligoester and a molten polymerization catalyst simultaneously into the mold, and including injecting a mixture of molten macrocyclic oligoester and a molten polymerization catalyst into the mold.

In some embodiments, molten macrocyclic oligoester is provided in a mixing chamber, and molten polymerization catalyst is also provided in a mixing chamber. The molten macrocyclic oligoester and polymerization catalyst are mixed, and are then introduced into a mold. The mixing chamber can be any sort of container or vessel sufficient for contacting the macrocyclic oligoester and polymerization catalyst. For example, a magnetic or mechanical mixer with a suitable vessel could be used. Alternatively, a container suitable for manual mixing could be used. A mold or a portion of a mold can serve as a mixing chamber.

After polymerization is complete, the mold may be opened to retrieve the formed articles with or without cooling the mold depending on the temperature of the polymerization reaction.

In certain embodiments, the volume ratio of the macrocyclic oligoester to the polymerization catalyst is within a range from about 2:1 to about 50:1, from about 5:1 to about 40:1, from about 5:1 to about 30:1, from about 10:1 to about 30:1, and from about 10:1 to about 20:1. The relatively high molar volume and/or molecular weight of the polymer-containing catalyst allows the use of lower ratios of macrocyclic oligoester to polymerization catalyst than would be possible using conventional, non-polymer-containing catalysts. Because metering and mixing a small amount of catalyst evenly into a relatively large amount of macrocyclic oligoester requires sophisticated and costly metering and mixing equipment, it is easier to properly mix and distribute catalyst throughout the mold using the polymerization catalysts described herein.

EXAMPLES

The following non-limiting examples are provided to further illustrate and to facilitate the understanding of the invention. These specific examples are intended to be illustrative of the invention. The products obtained from these examples may be confirmed by conventional techniques such as proton and carbon-13 nuclear magnetic resonance spectroscopy, mass spectroscopy, infrared spectroscopy, differential scanning calorimetry, gel permeation chromatography, and other chromatographic analyses.

Preparation of Polymer-Containing Organo-Metal Catalysts

Example 1

A mixture of 50.0 grams (10.72 mmol hydroxyl group) of poly(ethylene-ran-1,2-butylene) mono-ol (approximate number average molecular weight Mn=4200 Daltons, molecular weight units omitted hereinafter) and approximately 30 mL of toluene was charged to a 250-mL three-neck round-bottom flask equipped with a distillation adapter, a magnet stirring bar, and a nitrogen inlet. The mixture was stirred and heated to reflux under nitrogen during which time approximately 20 mL of toluene was removed by distillation. The mixture was then cooled to about 100° C., and 0.76 grams (2.68 mmol) of tetra-isopropyl titanate was added to the mixture via a syringe. The corresponding molar ratio of hydroxyl group of the polymer to titanium was approximately 4.00:1. The mixture was heated and kept under reflux for an additional 30 minutes at about 150° C., and then isopropyl alcohol was removed by distillation at a distillation temperature within a range from about 85° C. to 90° C. After the liberation of isopropyl alcohol stopped, the residue solvent was removed by distillation under vacuum in an oil bath at a temperature of about 150° C. Upon cooling, 50.0 grams of a clear, highly viscous material was obtained, corresponding to a yield of 99.7% of the theoretical maximum. The product contains the compound, tetrakis-poly (ethylene-ran-1,2-butylene) titanate, having the following formula:

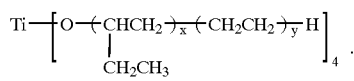

Example 2

The procedure of Example 1 was employed for the reaction of 50.0 grams (58.39 mmol hydroxyl group) of polyethylene monoalcohol (approximate number average molecular weight Mn=856) with 4.06 grams (14.29 mmol) of tetra-isopropyl titanate in toluene at reflux temperature. The corresponding molar ratio of hydroxyl group of the polymer to titanium was about 4.09:1. After removal of isopropyl alcohol and toluene and upon cooling, the clear and viscous liquid solidified. The yield was 49.0 grams, or about 98.8% of the theoretical maximum. The white solid product has a melting temperature of approximately 108° C. The product contains the compound, tetrakis-poly(ethylene) titanate, having the following formula:

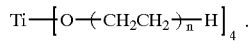

Example 3

The procedure of Example 1 was employed for the reaction of 40 grams (42.15 mmol hydroxyl group) of polyethylene-block-poly(ethylene glycol), having a number average molecular weight Mn of about 875 and containing 21% by weight of ethylene oxide units, with 2.97 grams (10.43 mmol) of tetra-isopropyl titanate in approximately 30 mL of toluene at reflux temperature. The corresponding molar ratio of hydroxyl group of the polymer to titanium was about 4.04:1. After removal of isopropyl alcohol and toluene and upon cooling, the clear and viscous liquid solidified. The yield was 39.2 grams, or about 98% of the theoretical maximum. The white solid product has a melting temperature of approximately 106° C. The product contains the compound, tetrakis-[poly(ethylene)-block-poly(ethylene glycol)] titanate, having the following formula:

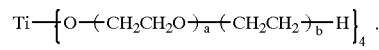

Example 4

The procedure of Example 1 was employed for the reaction of 18.05 grams (21.08 mmol hydroxyl group) of polyethylene-block-poly(ethylene glycol), having a number average molecular weight Mn of about 875 and containing 21% by weight of ethylene oxide units, and 25.0 grams (10.335 mmol) of poly(ethylene-co-1,2-butylene) diol with 2.94 grams (10.335 mmol) of tetra-isopropyl titanate in approximately 30 mL of toluene at reflux temperature. The corresponding molar ratio of hydroxyl group of the polymer to titanium was about 4.04:1. After removal of isopropyl alcohol and toluene and upon cooling, the clear and viscous liquid solidified. The yield was 42.5 grams, or about 98.5% of the theoretical maximum. The white solid product has a melting temperature of approximately 100° C. The produce contains the compound having the following formula:

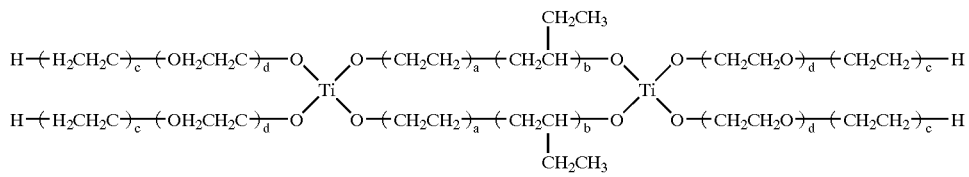

Example 5

A vial (21×70 mm, 4 drum) equipped with a magnetic stirring bar and a nitrogen/vacuum adaptor was charged with 5.0 grams (5.269 mmol hydroxyl group) of polyethylene-block-poly(ethylene glycol), having a number average molecular weight Mn of about 875 and containing 21% by weight of ethylene oxide units, and 0.669 grams (2.634 mmol Sn) of dibutyltin oxide. The vial was then immersed into an oil bath at 190° C. Upon melting, the liquid was heated for one hour while under vacuum to remove water. At the end of the reaction, as monitored by the distillation of butyl alcohol, vacuum was released with nitrogen, and the vial was taken out and cooled. The liquid solidified upon cooling. 5.6 grams of a white solid was recovered, corresponding to a yield of 99.9% of the theoretical maximum. The white solid has a melting temperature of 106° C. The product contains the compound, di-butyl-bis-[poly(ethylene)-block-poly(ethylene glycol)] stannoxane, having the following formula:

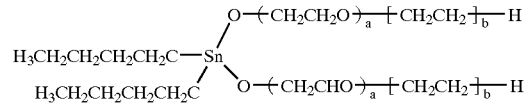

Polymerization of Macrocyclic Oligoesters Using Polymer-Containing Titanate Catalysts

Example 6

The macrocyclic oligoester used was macrocyclic co-oligoester having various degrees of oligomerization and containing about 95 mole percent of butylene terephthalate units and 5 mole percent of ethylene terephthalate units. A vial (21×70 mm, 4-drum) equipped with a magnetic stirring bar and a nitrogen/vacuum adapter was charged with 2.0 grams (8.91 mmol based on structural units) of the macrocyclic oligoester. The macro cyclic oligoester was dried by heating at approximately 190° C. at about 1 torr for about 5 minutes. The vacuum was released with nitrogen, and the mixture was cooled to room temperature. Various quantities of polymerization catalyst were then added, and the vial was re-immersed in the oil bath at 190° C. A reaction timer was started once the mixture was fully melted. The time for the melt to stop the rotation of the stirring bar was noted as an indication of the induction period. After the stirring bar stopped rotating, heating under nitrogen was continued for about 15 minutes during which time the polymerized product began to crystallize, yielding a white solid. At the end of the polymerization, the vial was cooled to room temperature and broken to remove the polyester product, which was analyzed by gel permeation chromatography to determine percent polymerization and approximate weight average molecular weight relative to polystyrene. The results are shown in Table 3 along with a control polymerization wherein tetra-isopropyl titanate was the polymerization catalyst.

for two minutes. The resulting powder was then dried at about 80° C. under vacuum, overnight.

Example 9

Comparative Example

A mixture of 20.0 grams (90.91 mmol ester group) of macrocyclic oligoester (same as used in Example 6), 77.5 mg (0.2727 mmol Ti) of tetra-isopropyl titanate, and about 50 mL of toluene were added to a 250-mL one-neck round-bottom flask. The mixture was heated to about 100° C. in an oil bath. Upon heating, the mixture became a clear solution. The flask was then transferred onto a rotavapor and toluene was removed under vacuum at about 80° C. The resulting solid was ground to a powder and dried further at about 80° C. under vacuum, overnight.

Polymerization of Blends of Macrocyclic Oligoester and Polymer-Containing Titanate Catalysts Example 10

A small vial (21×70 mm, 4 drum) was charged with 2.0 grams of the powdered one-component ready-to-use mac-

TABLE 3

Polymerization of Macrocyclic Oligoester Using Polymer-Containing Titanate Catalysts

| Catalyst | [Catalyst] Mole % | Volume Ratio M. Oligoester to Catalyst | Induction Period, seconds[a] | Poly'n Time, minutes | Ploymer Yield, % | Mw of Polymer |
|---|---|---|---|---|---|---|
| Control[b] | 0.30 | 217:1 | 5 | 15 | 97 | 93,000 |
| Example 1 | 0.30 | 3.3:1 | 30 | 15 | 97 | 92,800 |
| Example 2[c] | 0.30 | 18:1 | 20 | 15 | 95 | 154,600 |
| Example 2[d] | 0.30 | 18:1 | 20 | 15 | 95 | 120,600 |
| Example 2[e] | 0.30 | 18:1 | 20 | 15 | 96 | 142,400 |
| Example 3 | 0.30 | 15.6:1 | 20 | 2 | 96 | 94,000 |
| Example 4 | 0.30 | 14.4:1 | 20 | 2 | 93 | 123,000 |

[a]time required to stop rotation of stir bar
[b]tetra-isopropyl titanate
[c]catalyst had been exposed to air for 3 hours before use
[d]catalyst had been exposed to air for 24 hours before use
[e]catalyst had been exposed to air for 96 hours before use Preparation of Blend of Macrocyclic Oligoester and Polymer-Containing Titanate Catalysts Example 7

Solution Mixing

A mixture of 20.0 grams (90.91 mmol ester group) of macrocyclic oligoester (same as that used in Example 6) and 0.777 grams (0.2727 mmol Ti) of the polymer-containing organo-metal catalyst prepared in Example 2, and 50 mL of toluene were added to a 250-mL one-neck round-bottom flask. The mixture was heated to about 100° C. in an oil bath. Upon heating, the mixture became a clear solution. The flask was then transferred onto a rotavapor and toluene was removed under vacuum at about 80° C. The resulting solid was ground to a powder and dried further at about 80° C. under vacuum, overnight.

Example 8

Powder Mixing

A mixture of 20.0 grams (90.91 mmol ester group) of macrocyclic oligoester (same as that used in Example 6) and 0.777 grams (0.2727 mmol Ti) of the polymer-containing organo-metal catalyst prepared in Example 2 was added to a 100-mL lab blender. The mixture was mixed at high speed rocyclic oligoesters composition prepared in Examples 7 and 8. The vial was equipped with a nitrogen/vacuum adaptor, and the powder was degassed under vacuum for 3 minutes. The vacuum was then released with nitrogen, and the vial was heated to approximately 190° C. with a preheated oil bath at about 190° C. The composition was heated for various periods of time, and the polymerized product usually began to crystallize to a white solid within minutes. At the end of the polymerization, the vial was cooled to room temperature and broken to remove the polyester product, which was analyzed by gel permeation chromatography to determine percent polymerization and weight average molecular weight relative to polystyrene. The results are shown in Table 4 along with a control blend material with tetra-isopropyl titanate as catalyst (Example 9—Comparative Example).

TABLE 4

Polymerization of Blend Materials

| Blend | Poly'n Time, minutes | Polymer Yield % | Mw of Polymer |
|---|---|---|---|
| Control (Ex. 9) | 15 | 0 | — |
| Example 7 | 0.5 | 42 | 49,900 |

TABLE 4-continued

Polymerization of Blend Materials

| Blend | Poly'n Time, minutes | Polymer Yield % | Mw of Polymer |
|---|---|---|---|
| Example 7 | 1.5 | 51 | 61,100 |
| Example 7 | 3.5 | 67 | 80,800 |
| Example 7 | 8.5 | 77 | 96,300 |
| Example 7 | 13.5 | 77 | 97,700 |
| Example 8 | 0.5 | 70 | 78,200 |
| Example 8 | 2.5 | 90 | 107,200 |
| Example 8 | 5.5 | 97 | 115,500 |
| Example 8 | 8.5 | 96 | 122,700 |
| Example 8 | 13.5 | 97 | 129,900 |

Polymerization of Macrocyclic Oligoesters Using Polymer-Containing Organo-Tin Catalysts Example 11

A small vial (21×70 mm, 4 drum) was charged with 2.0 grams (8.91 mmol based on structural units) of macrocyclic oligoester (same as that used in Example 6). The vial was equipped with a magnetic stirrer and a nitrogen/vacuum adaptor. The macrocyclic oligoester was dried by heating at approximately 190° C. at about 1 torr for 5 minutes. The vacuum was released with nitrogen, and the mixture was cooled to room temperature. Next, 58.1 mg of tin catalyst (0.3 mole % tin based on macrocyclic oligoester) from Experiment 5 was added, and the vial was reheated with an oil bath at about 190° C. for about 5 minutes. At the end of the polymerization, the vial was cooled to room temperature and broken to remove the polyester product, which was analyzed by gel permeation chromatography to determine percent polymerization and approximate weight average molecular weight relative to polystyrene. The product had an approximately 94% polymerization and a weight average molecular weight of about 123,000.

Each of the patent documents disclosed hereinabove is incorporated by reference herein in its entirety. Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A method for polymerizing a macrocyclic oligoester comprising a structural repeat unit of the formula

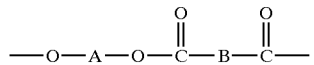

where A is an alkylene, a cycloalkylene, or a mono- or polyoxyalkylene group; and B is a divalent aromatic or alicyclic group, the method comprising the step of contacting, at an elevated temperature, a macrocyclic oligoester and a polymerization catalyst, the polymerization catalyst comprising a compound having the molecular formula.

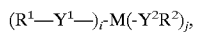

wherein:

each of i and j is an integer; $i \geq 0$; $j \geq 1$;

each $R^1$ independently is, or two or more $R^1$ groups taken together are, an alkyl group or an alkyl ether group each having between 1 and 20 carbon atoms;

each $R^2$ independently is a polymeric group comprising 25 or more carbon atoms, wherein at least one $R^2$ comprises at least one of (i) a polyalkylene group comprising 25 or more carbon atoms and (ii) a polyether group;

each $Y^1$ and $Y^2$ independently is a single bond or a heteroatom selected from the group consisting of O, S, and N; and M is Ti, Sn, or $-Z^1-(X)_k-Z^2-$, wherein $Z^1$ independently is Ti or Sn, $Z^2$ independently is Ti or Sn, each X independently is O or $O-R^3-O$, wherein $R^3$ is an alkylene group, and k is 1, 2, or 3

2. The method of claim 1 wherein the polymerization catalyst comprises a polyalkylene group.

3. The method of claim 1 wherein the macrocyclic oligoester and the polymerization catalyst are components of a blend material.

4. A method for polymerizing a macrocyclic oligoester comprising the steps of (a) providing a molten macrocyclic oligoester, wherein the macrocyclic oligoester comprises a structural repeat unit of the formula

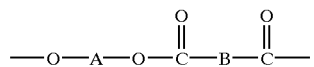

where A is an alkylene, a cycloalkylene or a mono- or polyoxyalkylene group; and B is a divalent aromatic or alicyclic group;

(b) providing a molten polymerization catalyst, the polymerization catalyst comprising a compound having the molecular formula; and

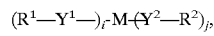

wherein:

each of i and j is an integer; $i \geq 0$; $j \geq 1$;

each $R^1$ independently is, or two or more $R^1$ groups taken together are, an alkyl group or an alkyl ether group each having between 1 and 20 carbon atoms;

each $R^2$ independently is a polymeric group comprising 25 or more carbon atoms, wherein at least one $R^2$ comprises at least one of (i) a polyalkylene group comprising 25 or more carbon atoms and (ii) a polyether group;

each $Y^1$ and $Y^2$ independently is a single bond or a heteroatom selected from the group consisting of O, S, and N; and M is Ti, Sn, or $-Z^1-(X)_k-Z^2-$, wherein $Z^1$ independently is Ti or Sn, $Z^2$ independently is Ti or Sn, each X independently is O or $O-R^3-O$, wherein $R^3$ is an alkylene group, and k is 1, 2, or 3; and (c) contacting the molten macrocyclic oligoester and the molten polymerization catalyst, thereby causing polymerization of the macrocyclic oligoester.

5. The method of claim 4 wherein the contacting step (c) takes place in a mold.

6. A method for polymerizing a macrocyclic oligoester comprising the steps of (a) providing a molten macrocyclic oligoester in a mixing chamber, wherein the macrocyclic oligoester comprises a structural repeat unit of the formula

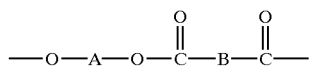

where A is an alkylene, a cycloalkylene or a mono- or polyoxyalkylene group; and B is a divalent aromatic or alicyclic group;

(b) providing a molten polymerization catalyst in the mixing chamber; the polymerization catalyst comprising a compound having the molecular formula;

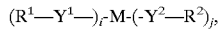

wherein:

each of i and j is an integer; $i \geq 0$; $j \geq 1$;

each $R^1$ independently is, or two or more $R^1$ groups taken together are, an alkyl group or an alkyl ether group each having between 1 and 20 carbon atoms;

each $R^2$ independently is a polymeric group comprising 25 or more carbon atoms, wherein at least one $R^2$ comprises at least one of (i) a polyalkylene group comprising 25 or more carbon atoms and (ii) a polyether group;

each $Y^1$ and $Y^2$ independently is a single bond or a heteroatom selected from the group consisting of O, S, and N; and M is Ti, Sn, or $-Z^1-(X)_k-Z^2-$, wherein $Z^1$ independently is Ti or Sn, $Z^2$ independently is Ti or Sn, each X independently is O or $O-R^3-O$, wherein $R^3$ is an alkylene group, and is 1, 2, or 3;

(c) mixing the molten macrocyclic oligoester and molten polymerization catalyst in the mixing chamber; and (d) introducing a mixed molten macrocyclic oligoester and polymerization catalyst into a mold.

* * * * *